Nov. 15, 1960  R. K. McKIRGAN  2,959,787
WELDING SHIELD
Filed March 6, 1959  2 Sheets-Sheet 2

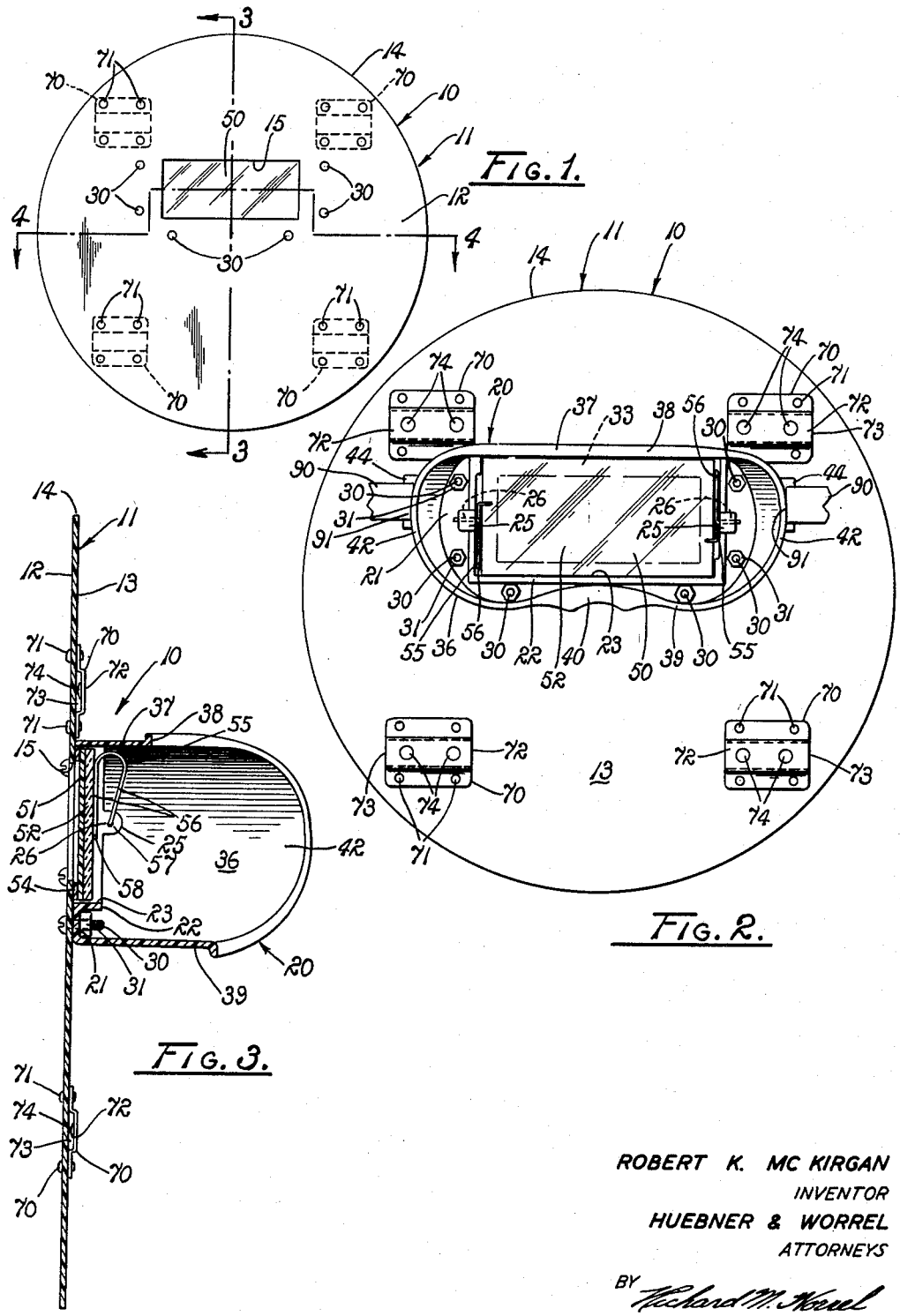

ROBERT K. MC KIRGAN
INVENTOR
HUEBNER & WORREL
ATTORNEYS
BY Richard M. Worrel

United States Patent Office 2,959,787
Patented Nov. 15, 1960

2,959,787

WELDING SHIELD

Robert K. McKirgan, Fresno, Calif.
(General Delivery, North Pole, Alaska)

Filed Mar. 6, 1959, Ser. No. 797,686

4 Claims. (Cl. 2—9)

The present invention relates to a head shield and more particularly to a workman's head shield or mask especially adapted for use by welders, cutters, and other workmen to protect their eyes, face and other parts of the head from bright light, flying particles, and the like.

In the past, welding shields have usually been of two general types depending on the welding or cutting task to be performed or the equipment to be used. For example, probably the simplest type of shield is a pair of goggles including a frame adapted to be held on the head by an elastic band and mounting a pair of filtering lens for protecting the eyes against excessively bright light and flying particles. This shield only protects the eyes and is inadequate for many operations.

Where more complete head and facial protection is desired, a relatively large hood has been employed. Usually this includes a helmet which fits the head and mounts the hood for pivotal movement between a "down" or shielding position and an upwardly retracted position. Such a hood accomplishes the desired purpose of protection but is relatively heavy and cumbersome to handle. Further, it has been known to shift about on the head so as to restrict the view when moving the head about relatively quickly. Furthermore, the glasses on this hood type of shield are difficult to change if broken or otherwise requiring replacement.

Accordingly, it is an object of the present invention to provide an improved workman's head shield.

Another object is to provide a light-weight face shield especially adapted for use by welders, cutters, and the like.

Another object is to provide a welder's shield which may optionally be employed primarily to protect the face and eyes or in addition thereto, to protect either side of the head.

Another object is to provide a shield which provides complete protection for the eyes, face, and other parts of the head.

Another object is to provide a shield of the type described which does not restrict normal movements of the head nor impair vision during such movement.

Another object is to provide a shield which is adapted to be dependably, firmly, and yet comfortably fitted on the head.

Another object is to provide a workman's head shield having parts which are easy to change if broken or otherwise requiring replacement.

Other objects are to provide a shield which is economical, durable, adjustable, and excellently suited for accomplishing its intended purposes.

These, together with other objects, will become more fully apparent upon reference to the following description and accompanying drawings.

In the drawings:

Fig. 1 is a front elevation of a head shield embodying the principles of the present invention.

Fig. 2 is a somewhat enlarged rear elevation of the head shield of Fig. 1.

Fig. 3 is a somewhat enlarged transverse section taken on line 3—3 of Fig. 1.

Figure 4:
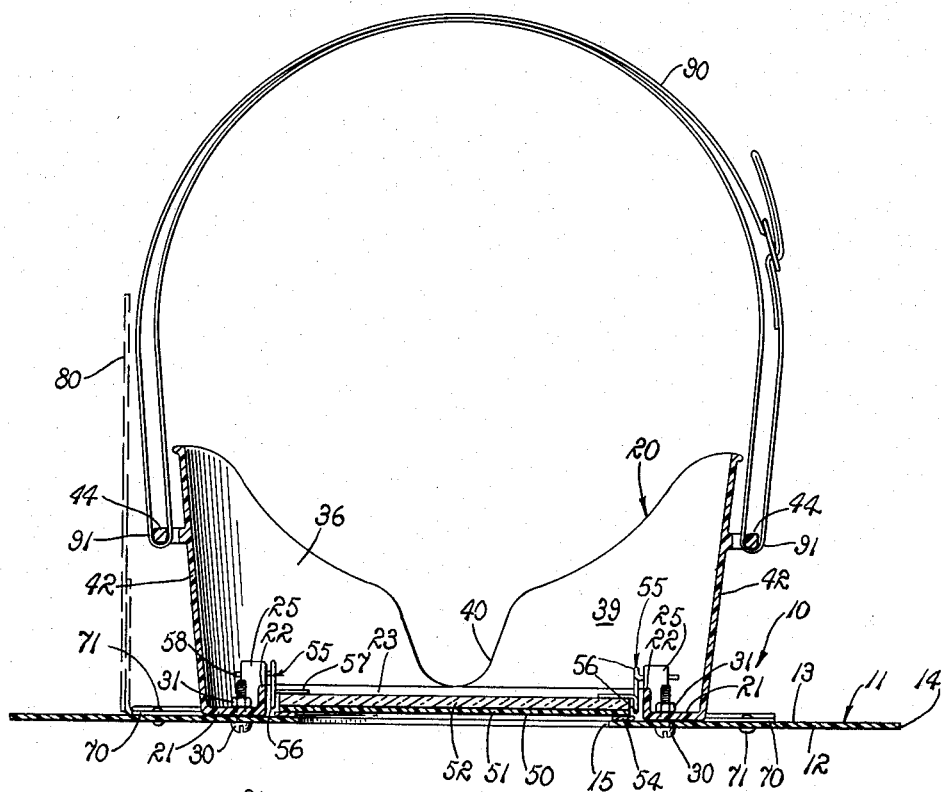
Fig. 4 is a somewhat enlarged transverse section taken on line 4—4 of Fig. 1 and showing a side plate in dashed lines.

Referring more particularly to the drawings, a head shield incorporating the principles of the present invention is illustrated in the drawings and is indicated generally by the numeral 10. The shield includes a substantially circular, flat, front plate 11 having a front surface 12, a rear surface 13, an outer circular edge 14, and an eccentrically located rectangular window 15 having upper and lower edges and opposite side edges. The plate is made of opaque, fire resistant material, and for this purpose, a light, strong, micarta material is preferably employed.

The shield 10 also includes goggles 20 having a front wall 21, a substantially rectangular rim 22 perpendicularly rearwardly extended from the front wall and circumscribing a rectangular opening 23 which is similar to but larger than the window 15 in the front plate 11. Bosses 25 are rearwardly extended from opposite side portions of the rim, adjacent to the opposite side edges of the window, and provide axially aligned sockets 26 which are disposed longitudinally of the opening and preferably on the longitudinal center line thereof.

The front wall 21 of the goggles 20 is positioned against the rear surface 13 of the front plate 11 so that the opening 23 circumscribes the window 15 and so that the rim 22 is in circumferentially spaced, circumscribing relation to the window. Bolts 30 are preferably rearwardly extended through the front plate and the front wall, and nuts 31 are screw-threadably turned on the bolts and tightened against the front wall of the goggles. It is to be noted that with the goggles attached to the plate in this manner, a marginal seating flange 33 is defined between the rim and the window.

The goggles 20 also have an annular masking wall 36 extended rearwardly from the front wall 21 and also generally circumscribing the rim 22. The masking wall has a top portion 37 providing a rear concave edge 38, a bottom portion 39 which is curved to provide a nose receiving notch 40, and outwardly convex side portions 42 smoothly joining the top and bottom portions. Preferably, the goggle walls are made of the same material as the front plate 11. Eyelets 44 are rigidly secured to the outside surface of the side portions 42.

The goggles 20 also include a substantially rectangular filter 50 which is similar in shape to the window 15 and the opening 23 but dimensionally intermediate the sizes of the opening and the window. Preferably, the filter includes a front pane or portion 51 of clear glass and a rear pane or portion 52 of darkly colored glass. The filter is fitted within the rim 22 with the front pane against the seating flange 33. Preferably, an annular gasket 54 is interposed the front pane of the filter and seating flange.

U-shaped springs 55 include spaced legs 56 terminating in laterally extended outer ends 57 rotatably received in the sockets 26 of the bosses 25 and oppositely laterally extended inner ends 58 axially offset from the outer ends. The springs are rotatable about their legs relatively resiliently compressed toward each other and with their outer ends between filter clamping positions with their inner ends spring-pressed against the filter, as illustrated in Figs. 2 and 3, and retracted positions, not shown, displaced substantially 180° from the described clamping positions wherein the legs are released and the inner ends are in rearwardly spaced relation to the filter. In the clamping positions, the forwardly disposed legs of the springs fit between the side edges of the filter and the side portions of the rim 22, as best illustrated in Figs. 2 and 3.

Mounting brackets 70 are secured to the rear surface 13 of the front plate 11 in substantially symmetrical rectangular relation by means of rivets 71. These brackets provide central portions 72 in rearwardly spaced relation to the rear surface of the plate thereby defining sockets 73. Central portions of the brackets have detents 74 pressed inwardly toward the sockets.

Figure 5:
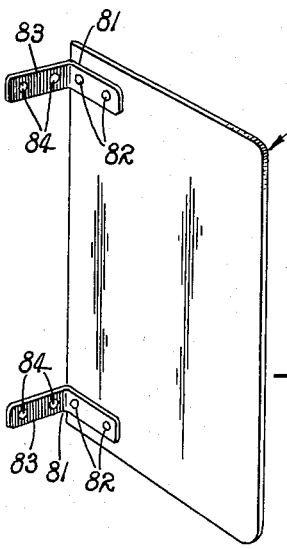
Fig. 5 is a perspective view of the side plate as employed in the head shield of the present invention.

With particular reference to Figs. 4 and 5, the shield 10 includes one or more substantially rectangular side plates 80 having upper and lower edges and front and rear edges. Upper and lower angulated side brackets 81 provide mounting portions secured to the side plate adjacent to the front edge thereof by means of rivets 82 and lugs or tongues 83 right-angularly extended from the mounting portions. The lugs have spaced apertures 84.

The side plate 80 is adapted for attachment to the front plate 11, as illustrated in Fig. 4. In order to effect this attachment, the lugs 83 are slid into the sockets 73 of the mounting bracket 70. The detents 74 in the mounting brackets are adapted to fit into the apertures 84 in the lugs thereby releasably and dependably to hold the lugs in the sockets. When attached in this manner, the side plate 80 extends substantially perpendicularly rearwardly from the rear surface to the front plate and in laterally outwardly spaced relation to the goggles 20. Although only one side plate has been illustrated and described, it is evident that two such side plates may be employed on one or both sides of the goggles. Of course, the side plate disclosed is adapted to fit on either side of the goggles. It is for these reasons that the four mounting brackets 70 have been illustrated.

For the purpose of attaching the shield 10 to the head of a workman, an elongated, preferably adjustable, elastic head strap 90 provides opposite ends 91 connected to or looped through the eyelets 44.

*Operation*

The operation of the described embodiment of the subject invention is believed to be readily apparent and is briefly summarized at this point.

Prior to operating welding equipment, for example, the goggles 20 are placed over the welder's face with the edge 38 fitted against the forehead and the notch 40 receiving the nose. In this position the side portions 42 of the wall 36 fit against the welder's head on opposite sides of his eyes so that the masking wall circumscribes the eye region of the face. In order to hold the shield on the head in this position with the masking wall in substantially light-tight engagement with the face, the strap 90 is extended around the back of the head and adjusted to fit. The workman then can view the work through the filter 50 and the window 15. It will be evident that the shield protects not only the eyes but the entire face and other parts of the face from the bright arc-light as well as from flying sparks, particles, and the like.

In the event that additional protection is desired for one or both sides of the head, one or two side plates 80 are attached to the front plate 11 prior to putting on the shield. The side plates may be attached or omitted as required. When used, the side plate extends rearwardly along the side of the head covering the ear and protecting the side of the head from flying particles.

If it is desired to replace or clean the filter 50, the springs 56 are pivoted into their retracted positions. This allows the filter panes 51 and 52 easily to be removed by pressing against the front pane and removing the filter from within the masking wall 36 of the goggles 20. Of course, the filter is replaced by following a reverse procedure. Likewise, if it is desired to remove or replace the entire set of goggles 20, bolts 30 and nuts 31 are removed and the goggles can then easily be detached from the front plate 11.

It will be evident from the foregoing that a head shield of the type described is very light and easy to work with. At the same time, the shield provides all the needed protection for any type of welding or cutting task. The shield allows full view of the work and is dependably, yet comfortably, held on the head so as not to shift about while working. The shield provides side plates which are optionally usable so as to keep the shield at a minimum weight when protection at the side is not needed.

Although the invention has been herein shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices and apparatus.

Having described my invention, what I claim as new and desire to secure by Letters Patent is:

1. A welder's shield comprising a front plate of opaque substantially fire-proof material having a transparent window therein, and opposite side edges, means for mounting the plate transversely in front of the face of a welder, a side plate of opaque substantially fire-proof material, a bracket mounted on the front plate at each side thereof, right-angular tongue means mounted on the side plate releasably received by one of the brackets whereby the side plate is releasably mounted on the front plate and is adapted to be mounted selectively at opposite sides of the face of the welder.

2. A head shield comprising a front plate of fire resistant material having a viewing window therein and front and rear surfaces, goggles having a front wall secured to the rear surface of the plate and providing an opening in registration with said window, the goggles having a rigid, substantially opaque masking wall rearwardly extended from the front wall in circumscribing relation to the opening and adapted to fit in substantially light-tight engagement against the face and around the eyes of the user, a light filter mounted in the opening of the goggles and covering the window for restricting the passage of light through the window, means connected to the goggles adapted to extend around the user's head for holding said masking wall against the user's face, the plate being large enough to cover the user's entire face to protect the same against flying sparks, particles, and the like, a side plate of fire resistant material abutting the rear surface of the front plate, in laterally spaced relation to the goggles, and extended from the front plate rearwardly of the goggles to protect the side of the user's head from flying sparks, particles, and the like, a U-shaped mounting bracket secured to the front plate adjacent to the side plate and providing a socket therein, and a tongue secured to the side plate releasably fitted in the socket of the bracket for releasably mounting the side plate on the front plate.

3. A welder's head shield comprising a substantially circular front plate of opaque, light-weight, fire resistant material having a substantially rectangular viewing window eccentrically located therein, and front and rear surfaces; goggles having a front wall releasably connected to the rear surface of the front plate, a substantially rectangular rim rearwardly extended from the front wall in circumferentially spaced circumscribing relation to the window so as to define a longitudinal filter seating flange on the front plate, a rigid annular, opaque masking wall of light-weight fire resistant material rearwardly extended from the front wall in circumscribing relation to the rim and having a rear edge adapted to fit the face of the welder in circumscribing relation to the eyes thereof, a substantially rectangular transparent light filter positioned against the seating flange in overlaying relation to the window for restricting the passage of light through the window, and spring means mounted on the rim for movement between positions engaging and yieldably resiliently urging the filter against the seating flange, and retracted positions permitting insertion and removal of the filter; and a strap connected to the masking wall of the goggles at opposite sides thereof adapted to be extended about the head of the welder for attaching the shield to the welder's head, the window having opposite side edges, the goggles including bosses rearwardly extended from the rim individually adjacent to the side edges of the window and in longitudinally spaced relation relative to the window, the bosses providing axially aligned sockets, and the springs having spaced legs resiliently flexible and compressible toward and away from each other and terminating in oppositely, laterally extended, axially offset inner and outer ends, the outer ends of the springs being individually rotatably journalled in the sockets of the bosses for rotation of the springs between filter clamping positions with the legs of each spring resiliently inwardly compressed toward each other, and with their inner ends bearing in spring-pressed engagement against the filter and retracted positions with the legs of each spring in outwardly expanded, relaxed condition and with said inner ends out of spring-pressed engagement with the filter.

4. A welder's head shield comprising a front plate of fire resistant material having front and rear surfaces, and a viewing window providing opposite side edges; goggles connected to the rear surface of the front plate and including a masking wall of fire resistant material rearwardly extended from the front wall in spaced circumscribing relation to the window thereby defining a filter seating flange about the window, the goggles including opposed, axially aligned, journaling sockets disposed inwardly of the masking wall and individually adjacent to the side edges of the window in spaced relation transversely thereof; a light filter positioned against the seating flange in overlying relation to the window; and springs having spaced legs resiliently flexible and compressible toward and away from each other and terminating in oppositely, laterally extended, axially offset inner and outer ends, the outer ends of the springs being individually rotatably journaled in said sockets for rotation of the springs between filter clamping positions with the legs of each spring resiliently inwardly compressed toward each other, and with their inner ends bearing in spring-pressed engagement against the filter, and retracted positions with the legs of each spring in outwardly expanded, relaxed condition and with said inner ends out of spring-pressed engagement with the filter.

References Cited in the file of this patent
UNITED STATES PATENTS

| | | |
|---|---|---|
| 1,205,308 | Work | Nov. 21, 1916 |
| 1,370,121 | King | Mar. 1, 1921 |
| 2,086,208 | Brekelbaum | July 6, 1937 |
| 2,777,129 | Hummel | Jan. 15, 1957 |